Patented June 8, 1943

2,321,463

UNITED STATES PATENT OFFICE 2,321,463

ORGANO-ALUMINUM SOLUTION AND PROCESS OF PREPARING SAME

Daniel H. Condit, Berkeley, Calif., assignor to Standard Oil Company of California, San Francisco, Calif., a corporation of Delaware No Drawing. Application April 24, 1939, Serial No. 269,782

20 Claims. (Cl. 252—308)

This invention relates to a new composition of matter comprising a novel type of solution of organo-aluminum compounds in organic solvents and to a method of preparing the same. More particularly, the invention involves a concentrated mobile uncongealed solution of aluminum salts of organic carbocyclic acids in a solvent, such as liquid hydrocarbons.

Heretofore, an outstanding characteristic of organic solutions of aluminum salts of carbocyclic acids has been the pronounced jelling effect produced whenever concentrated dispersions of these salts in organic solvents have been prepared. Solutions of aluminum naphthenate in mineral oils, such as lubricating oils, comprise a striking example of this phenomenon. Aluminum naphthenate has uniformly been found to cause a major increase in the viscosity of the oil even when added thereto in relatively small amounts. For example, more than approximately 2% of ordinary aluminum naphthenate normally produces an appreciable increase in the viscosity of the mineral lubricating oils, and from 5 to 10% by weight of the naphthenate based on the mineral oil results in a jelled solution having a rubbery or semi-solid consistency entirely unsuitable for purposes in which a mobile or pumpable liquid solution is required.

The production of mobile uncongealed concentrated solutions of aluminum salts of carbocyclic acids in organic solvents has long been a problem in the art. The prior known highly viscous or jelled dispersions have limited utility and are difficult to handle. This is particularly true where it is desired to utilize concentrated solutions of the aluminum salt for addition to other compositions, such as drying oils, lubricating oils, asphalts and the like. In addition to the difficulty of removing a highly viscous rubbery material from containers, prior known solutions have been subject to the disadvantage of resisting uniform dispersion in oils and other organic solvents. This tendency has necessitated the use of heat, vigorous agitation and the like in order to break down the jelled structure and obtain uniform dispersion and blending with other materials.

An object of the present invention is to provide a composition of matter comprising a new type of organo-aluminum solution consisting essentially of an organic solvent containing more than approximately 5% by weight of an aluminum salt of a carbocyclic organic acid.

Another object comprises the provision of organic solutions of aluminum naphthenate and aluminum salts of other carbocyclic acids characterized by a mobile liquid unjelled consistency at ordinary atmospheric or room temperatures.

A further object of the invention is to provide a new and useful process for preparing an aluminum salt of a carbocyclic organic acid and for producing a novel type of concentrated solution of the same.

The novel type of solution herein disclosed is, by reason of its new characteristics, capable of many applications not previously feasible for the congealed highly viscous solutions of aluminum naphthenate and similar salts heretofore known. The present composition finds particular utility in the preparation of liquid lubricants or of semi-liquid or semi-solid lubricants containing aluminum salts of carbocyclic acids. For example, aluminum naphthenate may be introduced into other lubricating compositions simply by addition of the correct proportion of a liquid concentrate containing, e. g., 50 to 70% of the aluminum salt. This procedure is highly advantageous since heretofore such concentrated solutions as were available were not readily miscible with other lubricants, were handled only with great difficulty, and necessitated heating to elevated temperatures with agitation to obtain uniform dispersion and blending of the ingredients.

A novel characteristic of the concentrated solutions herein disclosed comprises the ability of the solution to set up as a jell when brought in contact with substantial quantities of moisture. This property has a variety of applications. The non-viscous solution may be applied as a coating or impregnating composition while in the liquid unjelled state, and then upon exposure to water will form a jell which is an effective waterproofing agent. To illustrate: Liquid solutions in oil containing the present type aluminum compound and, when desired, also containing creosote, may be utilized to prevent end-checking of lumber by applying the composition to ends of lumber and thereby inhibit ingress and egress of moisture. Similarly, the oil solutions herein disclosed may be adopted as a cordage oil. Instead of using an ordinary cordage oil which is of a highly thickened or grease-like consistency, the cord or rope may be readily impregnated with the non-viscous concentrated solution without the necessity of heating to high temperature in order to obtain penetration through the rope fibers, and upon exposure to moisture the aluminum compounds will cause the oil to set up as a jell and form an effective moisture-proofing film. Also a lubricant containing a suitable amount of aluminum salts of carbocyclic acids in the state of solution obtained herein is useful for the lubrication of bearings, such as tractor bearings, which are exposed to mud and water. Lubricant which works out to the exposed bearing faces comes in contact with water and tends to set up a very stiff jelly-like mass which assists in protecting the bearing against moisture and abrasives.

The compositions herein disclosed afford a new method of compounding mineral castor machine oils, other thickened oils, and greases. A novel method is feasible which permits accurate control of the extent of thickening of the lubricant as well as a thorough and uniform dispersion of the salt in oil without the necessity of extensive heating and/or mechanical working of the mixture. For example, an anhydrous solution of 5%, 10% or even more aluminum naphthenate in mineral lubricating oil prepared according to this invention may be thickened and a jell structure set up by dispersing water therein. Control of the quantity of salt originally dissolved in the oil in conjunction with the amount of water incorporated permits accurate control and reproduction of the viscosity or the yield point of the thickened lubricant or grease. Water may be incorporated, for instance, by contacting the solution with wet steam.

The application of mineral oil insecticides in a jelled state is often desirable, and the solutions involved in this application are useful as an insecticide. Where the insecticide is to be applied by spraying, it is advantageous to avoid the necessity of passing a highly viscous jell through the spray nozzle because of the difficulty of properly and adequately atomizing the jelled oil. Accordingly, the water may be introduced into the uncongealed solutions either during spraying, as by atomizing the water and oil simultaneously in the nozzle, or by first adding water to the oil and immediately spraying the mixture before diffusion of the water into solution and/or jelling occur. Thus this invention enables one to spray an insecticide in a non-viscous uncongealed state and convert the insecticidal composition to a jell form either during or after application to the plant being treated. This method of applying insecticides is applicable to organic solutions containing other jell-forming oil-soluble metal salts.

In the paint, varnish and lacquer industry the present solutions may be incorporated in coating compositions as effective levelling agents, i. e., agents which eliminate brush marks, as well as waterproofing agents and the like. Solutions containing the aluminum naphthenate leave a tough flexible film on the surface of a coated object upon vaporization of the solvent. Thus a decreased tendency to crack, as well as improved weathering characteristics, may be imparted to coating compositions. The present composition may also be utilized as a plasticizer for nitrocellulose films. The present solutions are particularly advantageous for addition to paints and varnishes in that it is unnecessary to add the aluminum salt in a molten condition and at a high temperature. By utilizing a mobile concentrated solution of the aluminum salt in a mineral oil thinner it is possible to add the aluminum salt to drying oils at low temperatures and thereby avoid heating the coating composition with the attendant darkening of the paint vehicle. It may also be observed that asphalt paints, in particular, often show a tendency to crack on weathering, and that the present non-viscous aluminum naphthenate solutions may be adopted for minimizing this disadvantage.

The present concentrated solutions may be used to cut back and soften asphalt mixes or other plastic compositions. When so utilized they will, upon exposure, absorb sufficient water to cause hardening of the mass and at the same time their plastic properties will lend strength against fracture to the blend. The application of asphalt as a plastic to seal cracks has met with difficulty due to shrinkage of the composition. A thinner has usually been added to the asphalt in prior known compositions in order to produce a plastic mass, and as the thinner evaporated the asphalt tended to shrink and pull away from the material to which it was bonded, thus preventing an effective seal. The concentrated solutions herein disclosed may be added in proper amount to effect hardening of the plastic mass by absorption of water and inhibit excessive shrinkage of the composition on setting. These plastic sealing compounds may also find utility in tree surgery where trouble is experienced with the tendency for the motion of the tree to separate the composition from the wood. Non-viscous organic solutions may also be incorporated in polymerized drying oil and similar resinous compositions utilized in the linoleum industry.

The following specific examples of a solution and a method of preparing the same are given for purposes of illustration, it being understood that the invention in its broader aspects is not limited thereto:

Aluminum naphthenate is prepared directly by reaction of anhydrous aluminum chloride with free naphthenic acids. A suitable form of apparatus for effecting the reaction comprises a reaction vessel having a side neck fitted with suitable sealing means through which is passed a stirrer, a gas outlet and means for regulating the introduction of the naphthenic acid. The gas outlet may in turn be connected to a vacuum line through a water-washing device so that when a slow stream of air is passed through the reaction vessel hydrochloric acid may be drawn off and absorbed by the water in the washing zone. Anhydrous aluminum chloride is powdered and placed in the reaction vessel. Approximately ⅓ of the stoichiometrical proportion of naphthenic acids is then added. The cold water bath around the reaction vessel is then heated to boiling and the remainder of the naphthenic acids introduced in a controlled amount through the side neck. Heating is continued with the water bath until the reaction is completed. Usually approximately fifteen minutes will be sufficient for small batches.

A solvent may be introduced into the reaction chamber prior to, during or after reaction of the ingredients. A suitable solvent comprises a volatile hydrocarbon thinner or a mixture of such a thinner and a non-volatile oil, e. g., lubricating oil. It is desirable to introduce at least a part of the solvent into the reaction chamber before the reaction is completed, and I prefer to add part of the solvent during the reaction as a means of controlling the temperature thereof.

After the reaction is completed the reaction mixture is treated to remove chlorine or hydrochloric acid therefrom. A suitable method comprises addition of a small amount of 95% ethyl alcohol to the reaction mixture. The amount of ethyl alcohol (containing 5% water) should be sufficient to hydrolyze any chlorine which may remain in a state of chemical combination with the aluminum. After the addition of the alcohol the mixture is refluxed and distilled under partial vacuum to remove the alcohol, thinner and any hydrochloric acid which may be present. A second method of purifying the reaction mixture comprises adding a small amount of 95% alcohol, e. g., 5 to 10%, and in addition thereto incorporating in the reaction mixture a small amount of zinc dust sufficient to react with the hydrochloric acid present. The alcoholic reaction mixture is then refluxed and additional zinc dust added from time to time, when necessary, until hydrogen evolution ceases. The mass may then be diluted with additional thinner when necessary to render it fluid, filtered and the final product obtained by removing the alcohol and thinner by distillation under partial vacuum.

The extremely small amount of water (.02% or less based on the amount of naphthenate) in the alcohol serves to hydrolyze any chlorine which may be combined with the aluminum and yet, because of the extremely small proportion of water present and also because of the affinity of the alcohol therefor, jell-formation does not occur nor is the water taken up in the naphthenate in any substantial quantity or in amount sufficient to produce any jelling action in oil solutions subsequently prepared from the naphthenate. In this last method of purification zinc reacts with hydrochloric acid and also reacts in small quantities with free naphthenic acids to form zinc chloride and zinc naphthenate, respectively.

The above described methods of purification produce products having different characteristics. Both processes yield a naphthenate which produces uncongealed and anhydrous liquid solutions in oil. However, when the naphthenate is purified by distillation with 95% alcohol alone a concentrated oil solution thereof, i. e., 5% naphthenate or more, jells quickly on contact with water. When this ability of the liquid solution to quickly form a jell is to be utilized, the first purification procedure above described is the preferred one. On the other hand, when the naphthenate is purified by addition of zinc dust with the formation of small amounts of zinc naphthenate, oil solutions thereof set up as a jell much more slowly than oil solutions of naphthenates prepared by the first purification method. Where the ability to quickly form a jell is not important or is undesirable, the second method of purification will be preferred.

The rate of jell formation of the herein disclosed oil solutions in the presence of water may be modified and controlled by the addition of zinc naphthenate to either the aluminum naphthenate per se or to the oil solutions thereof. For example, a quick-jelling oil solution formed from aluminum naphthenate purified by the process first described above may be converted to a solution having slower jelling rates by dissolving in the oil small amounts of an oil-soluble zinc soap, such as zinc naphthenate.

When the naphthenate is to be used in viscous oils, such as mineral lubricating oils, I prefer to add the oil to the reaction mixture during or after the purification process. The viscous oil, e. g., mineral oil, may be added to the naphthenate in a quantity sufficient to form, without further treatment, a mobile uncongealed liquid solution containing the naphthenate in amounts as high as 70% by weight of the mineral oil. Tests on a characteristic sample of such a concentrate are as follows:

Neutralization number (mg. KOH/gm.) ____ 114
Per cent aluminum naphthenate _____ 54
Per cent ash _____ 5.3

A compounded lubricating oil prepared by adding the above concentrate to a cold lubricating oil (S. A. E. 30 acid treated oil from California crude) had the following properties:

Flash _____°F__ 390
Neutralization number (mg. KOH/gm.) ____ 2.58
Gravity _____ 21.3
Viscosity at 100° F. S. S. U _____ 590
Viscosity at 210° F. S. S. U _____ 56.1
Per cent ash _____ 0.11
Per cent aluminum naphthenate _____ 1.3

The aluminum naphthenate concentrate containing approximately 54% naphthenate and the lubricating oil were blended without difficulty and without the necessity of heating to produce the above compounded oil. By this method the necessity for breaking viscosity by extended heating or by contacting with live steam is avoided and an oil obtained which is particularly useful for the lubrication of Diesel engines by reason of its ability to inhibit piston ring sticking.

A viscous hydrocarbon oil has been given as an example of a suitable organic solvent. The invention, in its broader aspect, includes solutions in organic solvents in general, such as volatile petroleum thinners, drying or non-drying vegetable or animal oils whether bodied or unbodied, synthetic esters, ethers, ketones, hydroxylated esters, hydroxylated ethers, chlorinated hydrocarbons, etc. Examples of organic solvents are: acetone, benzene, butyl acetate, ethyl acetate, ethyl acetylglycolate, ethyl ether, ethyl glycol, ethyl glycolacetate, carbon disulfide, carbon tetrachloride, ethylene chloride, ethyl propionate, propyl acetate, ethylene glycol monomethyl ether, diethyl carbonate, ethylene glycol monoethyl etheyl, amyl acetate, acetate of glycol monoethyl ether, ethylene glycol, di-ethylene mono-ethyl ether, and benzyl alcohol.

The method of preparing the solutions of this invention is applicable to either the normal salts of aluminum or basic aluminum salts, such as aluminum mononaphthenate or aluminum dinaphthenate. By the term "basic aluminum salt" it is intended to designate an aluminum salt of an organic carbocyclic acid in which the acid is present in a quantity insufficient to satisfy the normal valence of aluminum, i. e., a salt containing less than three hydrogen equivalents of the organic acid to each atom of aluminum. Concentrated solutions containing from 5 to 80% of aluminum dinaphthenate in volatile petroleum thinners are mobile uncongealed liquids and have a viscosity within the range of readily flowable or pumpable liquids.

The present invention, by reason of the fact that it relates to a new type of organic solution of aluminum salt of carbocyclic acids, is not limited to solutions prepared by the foregoing specifically described method. Other methods may be utilized in preparing these types of solutions, namely, directly reacting a naphthenic acid with aluminum salts of hydracids, such as aluminum sulfide, aluminum bromide, and aluminum iodide, removing the hydracid and dissolving the reaction product in a solvent. An additional method comprises directly reacting a naphthenic acid with aluminum carbide ($Al_4C_3$), removing the gas formed, and dissolving the remaining reaction product in a solvent as previously described. The feature essential to the production of the herein disclosed unjelled or uncongealed mobile liquid concentrated solution of aluminum naphthenate and the like comprises the preparation of the aluminum naphthenate in a non-aqueous environment and its dissolution in the solvent in the absence of any substantial quantity of water. By "non-aqueous environment" it is intended to designate freedom from water as such, whether added or formed in situ during the preparation of the salt. The environment is still non-aqueous for the purposes of the invention even though extremely small amounts of water be present in a state not susceptible of absorption by the salt (e. g., when held in solution in 95% alcohol).

The solutions herein disclosed undoubtedly have a chemical and/or physical constitution different from the highly viscous or congealed solutions heretofore produced in prior processes. This seems self-evident from the fact that the solutions have radically different characteristics. The major increase in viscosity or jell-formation resulting from the dispersion in oil of aluminum naphthenate prepared in the presence of water is believed to be the manifestation of a colloidal dispersion rather than a true solution. Experimental evidence indicates this to be the case, or at least that prior known concentrated dispersions of aluminum naphthenate and the like were in a different physical state of dispersion than are the anhydrous solutions herein disclosed.

It is believed that the substantially non-colloidal jell-free concentrated solutions of aluminum salts of organic carbocyclic acids hereinabove described comprise a novel type of solution of these aluminum compounds and one which has not heretofore been obtained. It is not feasible to ascertain the precise chemical or physico-chemical constitution of the composition which is responsible for the new results herein disclosed, and the composition is therefore defined and distinguished by its more readily observed and measurable physical properties. One chemical fact which has been established is that to obtain a non-viscous non-jelled concentrated solution it is essential that the solution be substantially anhydrous and that the salt be prepared in a non-aqueous environment.

The invention, in its broader aspects, is not limited to the preparation of aluminum naphthenate solutions but is applicable to organic solutions of aluminum salts of other organic carbocyclic carboxylic acids such as phenyl stearic acid, benzoic acid, as well as to the preparation of solutions of oil-soluble aluminum phenates such as aluminum p-octyl phenate, aluminum p-dodecyl phenate, aluminum cetyl phenate, aluminum phenyl phenate and the like.

In the present specification and claims the term "viscous hydrocarbon oil" is used to designate a mineral oil of a consistency such as normally utilized in the production of liquid lubricating oils, for example oils having a minimum viscosity within the range of 135 S. S. U. at 100° F. to 150 S. S. U. at 210° F. The term "organic carbocyclic acid" is used herein to designate organic acids containing a carbocyclic nucleus such as 5, 6 or 7 carbon atom rings and includes saturated non-benzenoid, as well as benzenoid, nuclei in non-polymerizing carbocyclic acids of either the phenolic or carboxylic type. "Volatile hydrocarbon solvent" signifies solvents such as gasoline, petroleum ether, naphtha and the like which readily evaporate on exposure to the atmosphere.

This invention does not preclude the addition of other agents to the concentrated solutions such as oxidation inhibitors, blooming or dyeing agents, and corrosion inhibitors like alpha or beta hydroxy esters or esters containing unsaturated carbon-to-carbon bonds conjugated with the carboxyl group.

Specific examples of the solutions and methods of this invention have been described. This has been done by way of illustration only and with the intention that no unnecessary limitation should be imposed upon the invention thereby. It will be apparent to those skilled in the art that numerous modifications and variations may be effected in the practice of the invention which is of the scope of the claims appended hereto.

I claim:

1. A mobile substantially anhydrous organic solution, uncongealed at room temperature, of an anhydrous aluminum salt of an organic carbocyclic acid, said aluminum salt being a reaction product formed in a non-aqueous environment, said solution containing more than approximately 5% of said salt.

2. A mobile substantially anhydrous organic solution, uncongealed at room temperature, of an anhydrous aluminum salt of a naphthenic acid, said aluminum salt being a reaction product formed in a non-aqueous environment, said solution containing more than approximately 5% of said salt.

3. A mobile substantially anhydrous organic solution, uncongealed at room temperature, of an anhydrous aluminum salt of a carbocyclic carboxylic acid, said aluminum salt being a reaction product formed in a non-aqueous environment, said solution containing more than approximately 5% of said salt.

4. A mobile substantially anhydrous organic solution, uncongealed at room temperature, of an anhydrous aluminum phenate formed in a non-anhydrous environment, said solution containing more than approximately 5% of said salt.

5. A mobile substantially anhydrous organic solution, uncongealed at room temperature, of an aluminum salt of an organic carboxylic acid, said solution comprising normally liquid hydrocarbons containing approximately 5 to 80% of the anhydrous reaction product of a substantially anhydrous aluminum salt of an hydracid and said organic acid.

6. A mobile substantially anhydrous organic solution, uncongealed at room temperature, of an aluminum salt of an organic carbocyclic acid, said solution comprising normally liquid hydrocarbons containing approximately 5 to 80% of the anhydrous reaction product of substantially anhydrous aluminum chloride and naphthenic acid.

7. A mobile substantially anhydrous organic solution, uncongealed at room temperature, of an aluminum salt of an organic carbocyclic acid, said solution comprising normally liquid hydrocarbons containing approximately 5 to 80% of the anhydrous reaction product of substantially anhydrous aluminum chloride and a carbocyclic carboxylic acid.

8. A mobile substantially anhydrous organic solution, uncongealed at room temperature, of an aluminum salt of an organic carbocyclic acid, said solution comprising normally liquid hydrocarbon containing approximately 5 to 80% of the an hydrous reaction product of substantially anhydrous aluminum chloride and a phenol.

9. A mobile substantially anhydrous organic solution of an anhydrous aluminum salt of an organic carbocyclic acid in a viscous hydrocarbon oil, said aluminum salt being a reaction product formed in a non-aqueous environment, said solution being uncongealed at room temperature and comprising more than approximately 5% of said salt.

10. A mobile substantially anhydrous organic solution, uncongealed at room temperature, of an anhydrous aluminum salt of an organic carbocyclic acid, said solution containing more than approximately 5% of the anhydrous reaction product of a substantially anhydrous aluminum salt of an hydracid and said carbocyclic acid, said reaction product being formed in a non-aqueous environment, and a small amount of an oil-soluble zinc soap.

11. In a process of preparing an aluminum salt of a carbocyclic acid, said salt being characterized by the ability to dissolve in organic solvents without jell-formation, the steps which comprise reacting a substantially anhydrous aluminum salt of an hydracid with an organic carbocyclic acid in a non-aqueous environment to free the hydracid, removing hydracid as freed, adding a volatile organic solvent for the reaction product to form a solution thereof, removing residual hydracid from said solution, and recovering the aluminum salt freed of said hydracid.

12. In a process of preparing an aluminum salt of a carbocyclic acid, said salt being characterized by the ability to dissolve in organic solvents without jell-formation, the steps which comprise reacting substantially anhydrous aluminum chloride with an organic carbocyclic acid in a non-aqueous environment to form free hydrochloric acid, removing hydrochloric acid as freed, adding a volatile organic solvent for the reaction product to form a solution thereof, removing residual hydrochloric acid from said solution, and recovering the aluminum salt freed of said hydracid.

13. In a process of preparing an aluminum salt of a carbocyclic acid, said salt being characterized by the ability to dissolve in organic solvents without jell-formation, the steps which comprise reacting substantially anhydrous aluminum chloride with a naphthenic acid in a non-aqueous environment to form free hydrochloric acid, removing hydrochloric acid as freed, adding a volatile organic solvent for the reaction product to form a solution thereof, removing residual hydrochloric acid from said solution, and recovering the aluminum salt freed of said hydracid.

14. A process of preparing a concentrated organic solution of an aluminum salt of a carbocyclic acid, which comprises reacting a substantially anhydrous aluminum salt of a binary inorganic of an hydracid with an organic carbocyclic acid in a non-aqueous environment to form a free hydracid, removing hydracid from said reaction product, and adding an anhydrous organic solvent for said first aluminum salt.

15. A process of preparing a concentrated organic solution of an aluminum salt of a carbocyclic acid, which comprises reacting a substantially anhydrous aluminum salt of an hydracid with an organic carbocyclic acid in a non-aqueous environment to form a free hydracid, removing hydracid from said reaction product, dissolving said reaction product in a liquid hydrocarbon to obtain an uncongealed jell-free solution, and producing controlled jell-formation by introducing water into said solution.

16. In a process of preparing an aluminum salt of a carbocyclic acid, said salt being characterized by the ability to dissolve in organic solvents without jell-formation, the steps which comprise reacting a substantially anhydrous aluminum salt of an hydracid with an organic carbocyclic acid in a non-aqueous environment to free the hydracid, maintaining said reaction product free of substantial quantities of water, controlling the reaction temperature by introducing a volatile solvent for the carbocyclic acid aluminum salt into the reaction zone during the course of said reaction, and removing said solvent from the aluminum salt formed.

17. In a process of preparing a mobile anhydrous organic solution, uncongealed at room temperature containing an anhydrous aluminum salt of an organic carbocyclic acid, in an amount greater than approximately 5%, the steps of forming said aluminum salt by reacting an anhydrous aluminum salt of an hydracid with said carbocyclic acid in a non-aqueous environment, dissolving the salt in a liquid hydrocarbon to obtain an uncongealed jell-free solution, and controlling the susceptibility of said solution to jelling in the presence of water by introducing a small amount of zinc naphthenate.

18. In a process of preparing an aluminum salt of naphthenic acid, said salt being characterized by the ability to dissolve in organic solvents without jell-formation in concentrated solutions, the steps which comprise reacting a substantially anhydrous aluminum salt of a binary inorganic hydracid with said naphthenic acid in a non-aqueous environment to free an hydracid, removing the hydracid from the reaction zone, adding an anhydrous organic solvent for the aluminum naphthenate to the remaining reaction product, and recovering aluminum naphthenate from said solvent.

19. A process of preparing a concentrated organic solution of an aluminum salt of naphthenic acid which comprises reacting a substantially anhydrous binary aluminum compound selected from the group consisting of aluminum chloride, aluminum bromide, aluminum iodide, aluminum sulfide and aluminum carbide, with said naphthenic acid in a non-aqueous environment to free a gas and form a reaction product comprising said aluminum salt, and adding an anhydrous organic solvent for the aluminum naphthenate to said reaction product.

20. A process of preparing aluminum naphthenate which comprises reacting a substantially anhydrous aluminum chloride with naphthenic acid to form the aluminum salt of naphthenic acid and to free hydrogen chloride.

DANIEL H. CONDIT.